United States Patent Office 3,184,454
Patented May 18, 1965

3,184,454
RECOVERY OF CEPHALOSPORIN C
Edward Penley Abraham and Guy Geoffrey Frederick Newton, Oxford, and Clifford William Hale, Clevedon, England, assignors to National Research Development Corporation, London, England, a British corporation
No Drawing. Filed Jan. 19, 1961, Ser. No. 96,633
Claims priority, application Great Britain, Jan. 25, 1960, 2,706/60
7 Claims. (Cl. 260—243)

It has been shown in prior British Patent No. 810,196 that the antibiotic Cephalosporin C can be isolated in pure form from crude concentrates of the antibiotic by a variety of both solvent fractionation methods and of ion exchange chromatographic techniques and the present invention is for improvements in or relating to the recovery of Cephalosporin C as shown in the said specification and has for an object to provide a process which will overcome the disadvantages of previously proposed processes which involved the use of activated carbon for the adsorption of the active material from the fermentation medium.

In the prior processes, the fermenated medium (hereinafter referred to as "beer") was clarified by filtration or by centrifuging and was contacted with charcoal from which the active material was thereafter eluted and readsorbed on a column of alumina or on a column of an anion exchange resin from which it was again eluted and was then subjected to a solvent extraction process, whereby the Cephalosporin C was differentially partitioned from the co-present Cephalosporin N. Alternatively, the Cephalosporin N in the eluates from the carbon column or in the eluates from an ion exchange or an alumina column was either converted to its penillic acid by subjecting the solution to conditions of temperature and acidity at which the Cephalosporin N was converted to its penillic acid but at which the Cephalosporin C was substantially unaffected or the Cephalosporin N was destroyed by the action of the enzyme penicillinase, under conditions which left the Cephalosporin C unaffected. The Cephalosporin C was then separated from either the Cephalosporin N penillic acid or the products of the decomposition of Cephalosporin N by the action of penicillinase, by using the solvent fractionation or ion exchange resin chromatographic techniques described in the said prior British Patent No. 810,196.

The recovery process was somewhat complicated and attempts had been made to adsorb the Cephalosporin C from the acid-treated beer directly with an anion exchange material, but this direct adsorption from the beer suffered from the disadvantages that very large amounts of the anion exchange resin was required, owing to the presence in the beer of anions other than Cephalosporin C whilst, in addition, the chloride ion was currently eluted and presented difficulties in the further steps of recovery of the Cephalosporin C since, in the further recovery steps, there was a stage of elution by pyridine acetate leading to the presence of pyridine hydrochloride in the eluate which, during concentration of the solution, produced a pH value which was such as to destroy the Cephalosporin C and, in addition, prevented its precipitation from aqueous solution on addition of acetone; the removal of the chloride ion from the solution could have been effected by precipitation by means of silver compounds but this process would be uneconomic.

It has now been found that a convenient and eminently satisfactory process can be carried out by the use of a strong cation exchange resin to lower the pH for the step of decomposition of the Cephalosporin N, followed by treatment of the solution with a strong anion exchange resin to remove the chloride ion, after which the Cephalosporin C may be adsorbed upon an anion exchange resin from which it may be eluted and concentrated without the disadvantage arising from the above-mentioned presence of pyridine hydrochloride.

According to the present invention, there is provided a process for the recovery of Cephalosporin C from a beer containing it and co-present Cephalosporin N, which comprises lowering the pH of the clarified beer, preferably adjusted to a pH of about 5 to 6 by addition of acetic acid or sodium hydroxide to the cooled beer before clarification, by treatment with a cation exchange material containing strong acidic groups in hydrogen form (conveniently Amberlite resin IR–120) to the pH value of from 2.8 to 4.0, preferably to a value of about 3.0, separating the cation exchange material from the acidified medium, then passing the acidified medium through a strong anion exchange material (conveniently Amberlite resin IRA–400) in the form of a salt of a weak, volatile, monobasic organic acid, preferably acetic acid, to remove substantially all chloride and other inorganic anions therefrom and thereafter separating the Cephalosporin C from the percolate. Preferably, the Cephalosporin C is separated from the acidic percolate by contacting it with an anion exchange material (conveniently Amberlite resins IR–4B or IRA–400) in the form of a salt of a weak, volatile, monobasic, organic acid, preferably acetic acid, to absorb the Cephalosporin C thereon, preferably washing the anion exchange material with water and thereafter eluting adsorbed Cephalosporin C from the anion exchange material with acetic or formic acid which in the case of certain weak anion exchange materials may need to be buffered by the addition of a weak base, preferably pyridine or ammonia.

It is a feature of the invention that the Cephalosporin C solution eluted from the anion exchange material is concentrated preferably by distillation in vacuo in cases where pyridine buffers have been used. In cases where ammonium buffers have been used the material may be concentrated by distillation in vacuo followed by removal of any remaining volatile ammonium salts by sublimation in a high vacuum; or alternatively ammonia may be replaced by pyridine by passing the concentrate through a strong cation exchange material in the pyridine form and the pyridine buffers then removed by simple distillation. In each case the active material is precipitated by the addition of acetone, the precipitated solid being then dissolved and, if not free from Cephalosporin N, the solution is incubated at a pH of about 3 to convert residual Cephalosporin N to its penicillic acid whereafter the Cephalosporin C is less heavily loaded than the first column to a finely divided anion exchange material (conveniently Amberlite resins IRA–400, IR–4B or XE–58) from which it is chromatographed by elution development with acetic or formic acid which may be buffered as above described. The anion concentration is selected to give the fastest rate of development consistent with good resolution of the Cephalosporin C from the co-present impurities, the solution thereafter being concentrated preferably by distillation in vacuo in cases where pyridine buffers have been used or in cases where ammonium buffers have been used by distillation in vacuo followed by removal of any remaining volatile ammonium salts by sublimation in a high vacuum or by replacement of the ammonium salts by pyridine as previously described and the active materials re-precipitated by addition of acetone; the first anion exchange column above-mentioned, in which a concentration effect is obtained, may be omitted in which case the Cephalosporin C here obtained is in a more dilute solution. The process further includes the re-dissolving of the Cephalosporin C and its conversion to largely its sodium salt by the addition of sodium hydroxide to bring the solution to a pH value of about 6 and the process being completed by the solution being passed through a strong cation exchange material (conveniently Dowex resin 50 x 8) in sodium form, the Cephalosporin C sodium salt then being concentrated and crystallised from the solution. Salts other than the sodium salt can be made by an obvious modification of the foregoing procedure.

It will be seen that the above-defined process which may be operated only with the use of ion exchange materials, thus renders possible the production of the final solution substantially free from ions other than those of the final eluting solution, e.g. acetic acid or a salt thereof such as pyridine acetate and, of course, the Cephalosporin C.

It has been found that, when percolating the solution through the strong anion exchange material in order to remove the chloride ions, there is frequently a break-through of chloride ion before all of the Cephalosporin C has been percolated and it is a feature of the invention that the strong anion exchange material (Amberlite resin IRA–400) is used in a number of sections which are used successively, the solution being diverted from one section to a succeeding section immediately chloride ion is detectable in the percolate; by operating in this manner, it can be ensured that the anion exchange material is saturated with chloride ion, thus making it possible to ensure that all of the Cephalosporin C in the solution applied to the anion exchange material does, in fact, pass through, thus obviating any losses of active materials at this stage. By operating in this manner, the percolated Cephalosporin C solution collected from the successive sections of the anion exchanger contains no detectable amounts of chloride, sulphate or phosphate ions and also contains the whole of the Cephalosporin C in the original acidified beer applied to the anion exchanger.

The following is a description of the various classes of ion exchange materials referred to above.

(1) The strong cation exchange materials used for the adjustment of the pH value are ion exchange materials containing strong acidic groups, such as sulphonate or phosphate radicals, which do not significantly adsorb Cephalosporin C at pH values above 2.5 and typical suitable cation exchange materials are the resins sold under the trade names "Amberlite IR–120" or "Dowex 50 x 8."

(2) The strong anion exchange materials used for the removal of chloride and other anions from the solution are materials from which Cephalosporin C may very readily be displaced by chloride ions, and typical suitable anion exchange materials are the resins sold under the trade names "Amberlite IRA–400," "Dowex 1" or "Deacidite-FF."

(3) The anion exchange materials used for the adsorption of Cephalosporin C may be weak anion exchange materials which have a large capacity for Cephalosporin C when they are in acetate form and when the solution is at a pH of about 3, have the property of being discharged of Cephalosporin C at a pH of 6.0 to 1.0 M pyridine acetate and typical suitable weak anion exchange materials are the resins sold under the trade names "Amberlite IR–4B" and "Deacidite E"; alternatively strong anion exchange materials, such as the resins sold under the trade names "Amberlite IRA–400," "Dowex 1," "Dowex 2" and "Deacidite FF," from which Cephalosporin C is eluted by N-acetic acid may be employed.

(4) The strong cation exchange materials used in the stage of conversion of the purified Cephalosporin C to its sodium salt may be any strong action exchange material in sodium form, a typically useful cation exchange material being the resin "Dowex 50 x 8."

The following example will serve to illustrate the manner in which the invention may be carried into effect.

The whole culture is adjusted to pH 5.5 by the addition of glacial acetic acid while stirring. The suspension is passed through a suitable filter apparatus to produce a bright filtrate. The addition of a kieselguhr preparation, such as Celite Hy-flo Super-Cel, may be advantageous with some types of filtering apparatus and is not deleterious.

The bright filtrate is adjusted to pH 2.8 to 3.0 by addition of Amberlite Resin IR–120 in hydrogen form with stirring. When the desired pH is reached the suspension is filtered, is warmed to 37° C. and held thus for 3 hours. It is then cooled to as low a temperature as possible, preferably to 0° C.

Inorganic anions, such as chloride, can interfere with the purification process, for example they compete with Cephalosporin C for absorption on the resin. It is preferable, therefore, to remove them at this stage. It has been found that the resin ion-exchange material Amberlite IRA–400 in acetate form, if used in a column, adsorbs both Cephalosporin C and strong anions but that if loading is continued until break-through of chloride occurs the Cephalosporin C is totally eluted. A series of IRA–400 columns (mesh size about 30, in acetate form) is set up and the cool filtrate (at pH 3.0) is run through one of these until chloride breakthrough occurs. When this happens, the filtrate flow is immediately transferred to a second column and so on until the whole batch has been treated. The effluents are sample-tested for chloride with silver nitrate/nitric acid in the usual way. It is convenient to set up one large column which, according to the scale of operation contemplated, is large enough to be saturated with chloride with most of the batch, leaving a small amount to be dealt with by a series of small columns. In this way, losses of Cephalosporin C, which may be left adsorbed to the last column, are minimised.

We have found that the total volume of resin (settled in the columns) required is about 0.75% of the volume of filtrate to be treated. The flow-rate used is about 0.3 resin-bed volumes per minute, the depth of the columns being approximately 50 cm.

The filtrate is now substantially free of inorganic anions.

The antibiotic may be readily adsorbed to Amberlite resin IR4B in acetate form and is eluted therefrom with pyridine acetate buffer.

The resin (Standard Grade, about 30 mesh), contained in a column about 60 cm. deep, is approximately 80% saturated with Cephalosporin C by flowing the treated filtrate through it at about 0.1 bed-volumes/minute. It is necessary to provide about 2% by volume of resin of the volume of the beer to achieve this saturation level. The effluent should, of course, be free of Cephalosporin C.

The column is now washed with distilled water at a rate of 0.1 bed-volumes/minute until the effluent gives no ninhydrin reaction. This is followed by a wash with Normal acetic acid which removes a pigmented band giving a ninhydrin reaction but containing no Cephalosporin C. This band also strongly absorbs ultra-violet light at 260 m$\mu$ and it is usual to continue the wash until the absorption falls to $E=3$ or less (1 cm. cell). Elution is now commenced using Normal acetic acid brought to pH 5.5 by the addition of pyridine. This solution should preferably be cooled to 0° C. before use and the eluate fractions are kept as cool as possible after collection. The pH of the effluent steadily rises from 2.4 to 5.5 and when the pH is steady at 5.5 the flow may be stopped. The Cephalosporin C begins to be eluted when the effluent pH has risen to about 4.0 and is usually totally eluted when the effluent pH has risen to 5.2. The flow rate is about 0.07 bed-volumes/minute and the effluent is collected in fractions e.g. each fraction=0.16 bed-volume. We find that biological assay is the most reliable method of determining the whereabouts of the Cephalosporin C although the ninhydrin reaction may be used.

The active fractions are combined and evaporated in vacuo at not more than 25° C. to a syrup. The lower the evaporation temperature possible, the less destruction of Cephalosporin C occurs. It is advisable to check that no chloride is present before evaporation as the presence of this produces a low pH which destroys Cephalosporin C and it also prevents the subsequent acetone precipitation. If chloride is found to be present, it should be removed by determination of chloride and adding 0.95 equivalent of silver acetate solution. The precipitated silver chloride is removed by filtration.

The syrup is precipitated by the addition of at least 50 volumes of absolute acetone and the resulting powder is ground into the acetone. The powder may be removed at the centrifuge and washed thoroughly in absolute acetone to remove acetic acid. The powder, containing the crude free acid of Cephalosporin C, is dried off in vacuo. At this stage it usually has an activity about 1 unit/mg. The powder is dissolved in a little water and its pH, which should be about 3, is adjusted to 5 by the cautious addition of sodium hydroxide.

The crude sodium salt of Cephalosporin C is applied to a column of the finely divided form of Amberlite resin IR4B known as XE58 in acetate form. The material is then chromatographed by slow elution with dilute pyridine acetate. The Cephalosporin C is partially freed from impurity and the subsequent sodium salt may be readily crystallised.

The resin (150–200 mesh) is contained in a column and is approximately 50 cm. deep. The volume of the resin necessary is about 0.0055 times the volume of the original culture filtrate. The column is preferably kept in a refrigerated room at about 4° C. and an automatic fraction collector is used to fractionate the effluent. The irrigating fluid (0.3 M acetic acid brought to pH 5.0 with pyridine) is supplied to the top of the column and its flow rate controlled by some suitable device. We have used a constant head hydrostatic device or a peristaltic pump but at the scale now operated we find that a reservoir, containing the irrigating fluid, above which a constant air pressure is maintained gives the most reliable results.

The solution of crude sodium Cephalosporin C is allowed to seep into the top of the resin after which the top of the apparatus is cautiously filled with irrigating fluid and the flow commenced and regulated to about 0.1 bed-volumes/hour. Fractions of 0.018 bed-volumes are collected but these could be much larger than this if convenient.

We use biological assay of samples to determine the position of the Cephalosporin C but the ninhydrin reaction may be used. The Cephalosporin C emerges about 36–48 hrs. after starting the column (fractions 80–160 with a "tail" to 220 on our scale).

The active fractions are combined and evaporated to a syrup in vacuo at as low a temperature as possible. The syrup is precipitated by the addition of at least 98 volumes of absolute acetone. The resulting powder is washed several times with absolute acetone and dried off. The free acid at this stage has an activity of about 5–6 $\mu$/mg. (50–60% pure).

The free-acid Cephalosporin C powder is dissolved in a little water in which it should have pH=3. Sodium hydroxide solution is cautiously added with constant stirring until the pH=6.5. Because the solution may still contain some pyridine or other bases, it is advantageous to pass the solution through a small column of Dowex resin 50 x 8 in sodium form. The column is then irrigated with water until the effluent no longer gives a ninhydrin reaction. The solution is then concentrated in vacuo at as low a temperature as possible, to a syrup.

Crystallisation occurs spontaneously in the concentrated syrup. We allow the syrup to stand at room temperature for 24 hours. There is no advantage to be gained by cooling as crystallisation occurs better at room temperature and some unwanted gums are precipitated at low temperatures.

The gummy suspension of micro-crystals is stirred with a solution of ethanol (70% v./v.) in water and the crystals are removed by filtration or at the centrifuge. The are washed with 70% ethanol solution until no further colour is removed and dried off in vacuo over phosphorus pentoxide. The impurities are much more soluble in 70% ethanol at 25° C. than the antibiotic. The washings are pooled and may be evaporated to syrup, reprecipitated with acetone and the resulting powder dissolved in water and evaporated to a syrup when a second, less pure, crop of crystals may be obtained.

We claim:

1. A process for the recovery of Cephalosporin C from a clarified beer containing it and co-present Cephalosporin N which comprises acidifying the beer to convert the Cephalosporin N at least in part to its penillic acid and then separating Cephalosporin C from the beer so treated by lowering the pH of the beer to a value of from 2.8 to 4.0 by treatment with a cation exchange material containing strong acid groups in hydrogen form selected from sulfonate and phosphate groups and on which Cephalosporin C is not adsorbed, separating the cation exchange material from the acidified beer, treating the acidified beer with a strong anion exchange material in which the anion groups are the anions of a weak, volatile, lower saturated aliphatic monobasic acid to preferentially adsorb chloride and other inorganic anions but not the Cephalosporin C, said anion exchange material being used in such an amount as to be substantially saturated by said chloride and other inorganic anions thereby leaving the Cephalosporin C in the acidified beer.

2. A process according to claim 1 wherein the removal of chloride and other inorganic anions is effected by the use of a plurality of sections of said strong anion exchange material, the flow of acidified medium to the first section being diverted to a second section on break-through of chloride ion in the first section and being further diverted to a succeeding further section on chloride ion breakthrough.

3. A process according to claim 1 wherein the Cephalosporin C is separated from the effluent from the strong anion exchange material by contacting it with an anion exchange material, in which the anion groups are the anions of a weak, volatile, lower aliphatic monobasic acid, to adsorb the Cephalosporin C thereon and the adsorbed Cephalosporin C is eluted with an acid selected from the group consisting of acetic and formic acids.

4. A process according to claim 3 wherein the eluting acid is buffered by the addition of a weak volatile base.

5. A process according to claim 4 wherein said weak base is pyridine and wherein the eluted solution is concentrated by distillation in vacuo.

6. A process according to claim 4 wherein said weak base is ammonia and wherein the eluted solution is concentrated by distillation in vacuo followed by sublimation of residual ammonium salts by sublimation in a high vacuum.

7. A process according to claim 4 wherein the Cephalosporin C is precipitated from the eluted solution by the addition of acetone.

References Cited by the Examiner

FOREIGN PATENTS 810,196   3/59   Great Britain.

OTHER REFERENCES

Bergman: The Chemistry of Acetylene and Related Compounds, p. 80 (1948).

Kunin: Ion Exchange Resins, pp. 150–153 (Second Edition) (1958).

Newton et al.: Biochemical Jour., vol. 62 (1956), pp. 652 to 658.

NICHOLAS S. RIZZO, *Primary Examiner.*

IRVING MARCUS, *Examiner.*